(12) United States Patent
Waller (10) Patent No.: US 6,613,384 B1
(45) Date of Patent: Sep. 2, 2003

(54) METHOD FOR MANUFACTURING A MEMBRANE

(75) Inventor: David Waller, Rugby (GB)

(73) Assignee: Norsk Hydro Asa, Oslo (NO)

(*) Notice: Subject to any disclaimer, the term of this patent is extended or adjusted under 35 U.S.C. 154(b) by 0 days.

(21) Appl. No.: 09/913,795

(22) PCT Filed: Feb. 18, 2000

(86) PCT No.: PCT/NO00/00061
§ 371 (c)(1),
(2), (4) Date: Aug. 16, 2001

(87) PCT Pub. No.: WO00/48717
PCT Pub. Date: Aug. 24, 2000

(30) Foreign Application Priority Data

Feb. 19, 1999 (NO) .......................................... 19990811

(51) Int. Cl.$^7$ .............................. B05D 3/02; B05D 1/18; B27N 3/02
(52) U.S. Cl. ................. 427/243; 427/376.1; 427/376.2; 427/430.1; 427/443.2; 264/109; 264/131
(58) Field of Search .............................. 427/243, 372.2, 427/376.1, 376.2, 430.1, 443.2; 264/109, 125, 131

(56) References Cited

U.S. PATENT DOCUMENTS

| | | | |
|---|---|---|---|
| 4,946,592 A | 8/1990 | Galaj et al. | |
| 4,957,673 A | * 9/1990 | Schroeder et al. | .......... 264/643 |
| 5,238,569 A | 8/1993 | Soria et al. | |
| 5,240,480 A | 8/1993 | Thorogood et al. | |
| 5,624,542 A | 4/1997 | Shen et al. | |
| 5,683,797 A | * 11/1997 | Carolan et al. | .......... 428/307.3 |

FOREIGN PATENT DOCUMENTS

| | | | |
|---|---|---|---|
| EP | 0327687 | 8/1989 | |
| EP | 0592809 | 4/1994 | |
| EP | 592809 B1 | * 4/1994 | .......... B01D/53/22 |
| EP | 0 663 231 | 7/1995 | |
| EP | 0714104 | 5/1996 | |

OTHER PUBLICATIONS

Abstract of JP 04180822 published Jun. 29, 1992.

* cited by examiner

Primary Examiner—Michael Barr
(74) Attorney, Agent, or Firm—Wenderoth, Lind & Ponack, L.L.P.

(57) ABSTRACT

The present invention relates to a method for manufacturing a dense and crack-free ceramic membrane which selectively transports oxygen when it is subjected to an oxygen partial pressure gradient, by the following steps: a) preparation of a porous ceramic substrate, with an open network of pores, which allows the transport of gas; b) deposition of a film or coating of an oxygen ion conducting material onto the porous ceramic substrate, by contacting the porous substrate with a colloidal dispersion or slip; c) thermally treating the substrate and film or coating to produce a dense, crack-free membrane on the surface of the porous substrate.

4 Claims, 8 Drawing Sheets

Pore Size Distribution in La$_2$NiO$_4$ Substrate Sintered at 1100°C

Figure 1. Pore Size Distribution in $La_2NiO_4$ Substrate Sintered at 1100°C

Figure 2. Micrograph of $La_2NiO_4$
Substrate sintered at 1100°C

Figure 3. Micrograph of $La_2NiO_4$
Layer deposited onto porous substrate and sintered at
1100°C Figure 4. Pore Size Distribution in $La_2NiO_4$ Substrates as a Function of Sintering Temperature Figure 5. Micrograph of $La_2NiO_4$
Substrate sintered at 1300°C Figure 6. Shrinkage and Porosity of Porous Lanthanum Nickelate Substrates Figure 7. Micrograph of $La_2NiO_4$
Film and substrate sintered at 1300°C Figure 8. Micrograph of $La_2NiO_4$
Film sintered at 1300°C

METHOD FOR MANUFACTURING A MEMBRANE

This application is a 371 application of PCT/NO00/00061 filed Feb.18, 2000.

The present invention relates to a method for manufacturing a dense and crack-free ceramic membrane which selectively transports oxygen when it is subjected to an oxygen partial pressure gradient. Such supported film-based membranes, consisting of mixed-conducting oxides, have a range of technological applications including oxygen separation, electrochemical membranes reactors and power generation.

Ceramic membranes consisting of mixed-conducting oxides allow the selective transport of oxygen when subjected to an oxygen partial pressure gradient, and this ability allows the production of 100% pure oxygen as e.g. described in European Patent Application No. 95100243.5 (EP-A-663230), U.S. Pat. No. 5,108,465, U.S. Pat. No. 5,516,359, U.S. Pat. No. 5,447,555 and U.S. Pat. No. 5,240,480. Oxygen, supplied from compressed air for example, is dissociated on the surface of the mixed-conducting membrane, and it becomes incorporated into the bulk of the oxide, in the form of an oxygen anion. The oxygen is able to move within the oxide lattice via oxygen ion vacancies. A pair of oxygen anions at the surface are able to be recombined and be oxidised to molecular oxygen, which desorbs. If a membrane of the mixed-conducting material is subjected to an oxygen partial pressure gradient, oxygen is able to be selectively transported from the high partial pressure side of the membrane to the low partial pressure side.

The oxygen transported through the membrane may be the desired product, or alternatively, it may be used for the production of synthesis gas as described in U.S. Pat. No. 5,356,728, for partial oxidation of hydrocarbons as in European Patent Application No. 90134083.8 (EP-A-438902) and U.S. Pat. No. 5,714,091 or power generation applications as in International Patent Applications Nos. PCT/NO97/00170, PCT/NO97/00171 and PCT/NO97/00172 (Norsk Hydro ASA). The partial pressure gradient across the membrane may be generated by either supplying compressed air to one side of the membrane, or by reducing the oxygen pressure at the other side of the membrane. The latter could be achieved by pumping, if pure oxygen is the desired product, or by exposing one side to the membrane to a gas which has a low oxygen pressure, for example methane, in a partial oxidation reactor.

The flux of oxygen through such a membrane is determined by the ambipolar conductivity of the membrane material, the oxygen partial pressure gradient and the thickness of the membrane. Therefore, the flux of oxygen through the membrane may be increased by reducing the thickness of the membrane. When the thickness of a ceramic membrane is reduced below approximately 100 $\mu$m, handling of the membrane becomes difficult because of its mechanical weakness. This limit on thickness is higher if the membrane is to be subjected to a total pressure gradient, rather than only an oxygen partial pressure gradient.

However, membranes consisting of a dense film or coating on a porous substrate may be prepared. The film will act as a functional layer for the selective transport of oxygen and the substrate will provide mechanical strength to the film. The connected porosity of the substrate allows the transport of gas either to or from the membrane.

A layer which is less than 10 $\mu$m in thickness is generally referred to as a film, whereas thicker layers are termed coatings. For the purpose of this document it will not be distinguished between these terms. Similarly, it will not be distinguished between the terms substrate and support.

Many techniques have been used to deposit dense films or coatings onto a supporting substrate. Such methods include chemical vapour deposition (CVD) as described by Y. S. Yin in his doctoral thesis entitled "Chemical and Electrochemical Vapour Deposition of Zirconia Solid Solutions in Porous Ceramic Media", University of Twente, The Netherlands, 1992 physical vapour deposition (PVD), which is a generic term for a range of sputtering techniques as described by Hayashi and co-workers in Electrochemnical Society Proceedings Volume 95–24, pages 221 to 227, and electrostatic spray pyrolysis (ESP) as in International Patent Application WO 97/21848. However, these techniques have a number of disadvantages which may include a high cost of precursors, a slow film growth rate; an ability to only grow very thin films or the need to have a line-of-sight between the substrate being coated and the film source material.

Film deposition techniques that are based on contacting the substrate with a liquid containing the material to be deposited, either in solution or as a dispersion may be attractive. Two distinct processes are referred to as sol-gel techniques. In the first method of deposition, in-situ formation of a sol occurs in the liquid phase, usually through an alkoxide precursor. The sol which has formed is then deposited onto the substrate by spin coating or dipping. In the second sol-gel techniques, the solution containing a polymeric precursor is deposited onto the substrate, and then a further treatment (hydrolysis or thermal) leads to the formation of the film.

The main object of the invention was to arrive at an improved method for manufacturing a dense and crack-free ceramic membrane which has not the disadvantages mentioned above.

The inventor found that these disadvantages were eliminated if the dense and crack-free ceramic membrane was manufactured by the following steps:
 a) preparation of a porous ceramic substrate, with an open network of pores. which allows transport of gas,
 b) deposition of a film or coating of an oxygen ion conducting material onto the porous ceramic substrate, by contacting the porous substrate with a colloidal dispersion or slip,
 c) thermally treating the substrate and film or coating to produce a dense, crack-free membrane on the surface of the porous substrate.

The substrate and the film or coating is represented by the formula A×A'x'A"x"ByB'y'B"y"Oz$_{zd}$ where A, A' and A" are chosen from the group comprising group 2 elements and lantlanides and B$_y$, B'$_y$ and B"$_y$ are transition metal or group 3 elements and wherein 0<x<2, 0<x'<2, 0<x"<2, 0<y<1, 0<y'<1, 0<y"<1, 1<x+x'<2, y+y'+y"=1, x+x'+x"<2 and z±d is such that charge neutrality is maintained.

The present invention describes a method by which membranes for oxygen transport applications may be prepared by the deposition of a layer of oxide particles onto a porous substrate with bi- or multimodal distribution of pore sizes. The oxide particles are deposited from a colloidal dispersion by a capillary action and dip-coating processes. Subsequent thermal treatment of the substrate and the deposited layer leads to the formation of a dense film or coating supported on the substrate, which retains open porosity which allows gas transport to and from the interior surface of the film.

The method according to the present invention, involves the deposition of a layer of oxide particles onto a porous substrate. Subsequent sintering of the coated substrate results in the formation of a coating of high density, which is free of cracks. The coating is prepared in the form of a colloidal dispersion or slip (a slip is defined as a dispersion of a powder in a liquid). When the porous substrate is dipped into the slip, the liquid phase in the slip is drawn into the pores of the substrate, through capillary action, and this leads to a deposition of a layer of particles on the surface of the substrate. This process forms the basis of slip casting of bulk ceramic components. A further deposition of particles occurs when the substrate is withdrawn from the slip, by a dip-coating action.

When the substrate immersion time is short, the relationship between the thickness of the layer, produced by capillary action, and the immersion time is given by, $$L^2_{Capillary} = \frac{2 p_{Capillary} t}{\eta_{Slip}\left(\frac{V_{Layer}}{V_{Slip}} - 1\right)\left(\frac{1}{K_{Layer}} + \left(\frac{((V_{Layer}/V_{Slip}) - 1)}{P_{Substrate} K_{Substrate}}\right)\right)}$$

where $L^2$Capillary, is the thickness of the layer, $P_{Capillary}$ is the capillary suction pressure of the substrate, t is the immersion time, η is the viscosity, V is the solid volume fraction, K is the permeability, P is the porosity and the subscripts refer to the slip, the deposited layer and the substrate [M. Tiller and C. Tsai, J. Amer. Ceramic Soc., 69, 882–887 (1986)]. The capillary pressure $P_{Capillary}$ is approximated by the Laplace equation:

$$P_{capillary} = S\alpha \cos\gamma$$

where S is the surface area of the substrate, α is the surface tension of the slip and γ is the contact angle. For a substrate that is completely wetted by the dispersion, cosγ=1.

For long dip times, a limiting thickness will be reached when all of the pores in the substrate are saturated with liquid and it is dependant on the solid volume in the slip, the pore volume of the substrate and the thickness of the substrate. This limit may only be exceeded if a continuous flux of the dispersion medium was able to pass through the substrate. This may be achieved if either a pressure was applied to the slip or a reduced pressure was applied to the opposite side of the substrate. These methods of increasing the thickness of the deposited layer are most easily realised if a substrate with a tubular geometry is used.

Additional particles are deposited onto the coating as the substrate is withdrawn from the slip and this forms the basis of conventional dip coating techniques. The thickness of the liquid layer that is deposited onto the substrate when withdrawing it from the slip has been analysed by L. D. Landau and B. G. Levich in Acta Physichem U.R.S.S., 17, 42–54 (1942), and is given by:

$$L_{dip} = 0.944\left(\frac{\eta_{dv} U}{\gamma_{Slip}}\right)^{1/6}\left(\frac{\eta_{dv} U}{\rho_{Slip} g}\right)^{1/2} \text{ or } L_{dip}\alpha(\eta_{dv}U)^{2/3}$$

where $L_{dip}$ is the thickness of the liquid layer produced when withdrawing the substrate from the slip, U is the withdrawal speed; $\eta_{dv}$ is the dynamic viscosity of the slip, $Y_{shp}$ is the surface tension, $P_{Shp}$ is the density of the slip and g is the acceleration due to gravity. Therefore, the thickness of the layer deposited on the substrate, and hence the thickness of the sintered film, is controlled by the physical characteristics of the substrate, the slip, and by the process conditions, in terms of dip time and withdrawal rate.

This method allows the preparation of dense crack-free films, with thickness' ranging from 5 to 70 μm. The deposition of the green film is carried out in a rapid, single process step, and unlike spin coating methods, multiple coating steps are not required to develop thick films. The typical thickness of films prepared by spin-coating of polymeric precursors is 0.1–0.2 um. Generally, up to 10 layers may be deposited before cracking becomes problematic. Therefore, the maximum thickness of film that may be deposited is of the order of 1 to 2 μm. For some applications, this is adequate. However, for applications involving oxygen transport applications, operating at high temperatures, grain growth due to sintering, in a thin coating or film, may lead to the development of holes in the membrane. This may reduce the performance of an oxygen separation membrane or it could lead to the complete structural failure of a partial oxidation membrane. It is therefore desirable to produce membranes that are considerably thicker than the grain size of the membrane material. This will allow a safety margin for maintaining the structural integrity of the film during the course of its operating life, in regards to grain growth within the membrane. The slip coating method described here is able to readily produce coatings of thickness' exceeding 10 μm.

To produce a crack-free film and to ensure that it remains intact during operation it is necessary to ensure that the film and the substrate shrink to the same extent during sintering, and once dense, the film and the substrate have the same thermal expansion coefficient. These objectives can be achieved if:

1. The substrate and the film have the same chemical composition, so that on heating the dense film will expand to the same extent as the substrate, thus eliminating the source of compressive or tensile stresses within the film.
2. When preparing the film using slip coating, the powder that is used to produce the slip has a similar thermal history as the substrate. This ensures that the Green film and the substrate exhibit the same sintering characteristics during densification of the film The method is not restricted to deposition of films on the surface of substrates with a planar geometry, as a film may be deposited onto any surface of the substrate that is accessible to the colloidal dispersion.

The invention will be further explained and envisaged in the examples and the figures.

The following examples describe the production of a dense film of $La_2NiO_4$, a mixed-conducting oxide as described in the non published Norwegian Patent Application No. 982321, supported on a porous substrate having the same chemical composition.

EXAMPLE 1

This example shows the preparation of ceramic substrate of high porosity.

The porous substrate was prepared by the following method. A mixed-conducting oxide powder, of composition $La_2NiO_4$, prepared by spray pyrolysis of metal nitrate salts at 700° C., was calcined at 1050° C. for 20 hours. This powder was dry ball-milled with an equal volume of monodisperse polymethacrylmethacrylate (PMMA) polymer spheres, with a diameter of 7 $\mu$m. The polymer acted as a pore former, which leads to the formation of a well-defined, open pore structure. The polymer-oxide powder was pressed into discs using a uni-axial press. The ceramic/polymer pellets were heated at 0.5° C./min to a temperature of 500° C., to remove the polymer by combustion. The oxide pellets were then heated at 5° C./min to an initial sintering temperature, in the range of 1100 to 1300° C., for a period of four hours, before cooling to room temperature.

Figure 1:
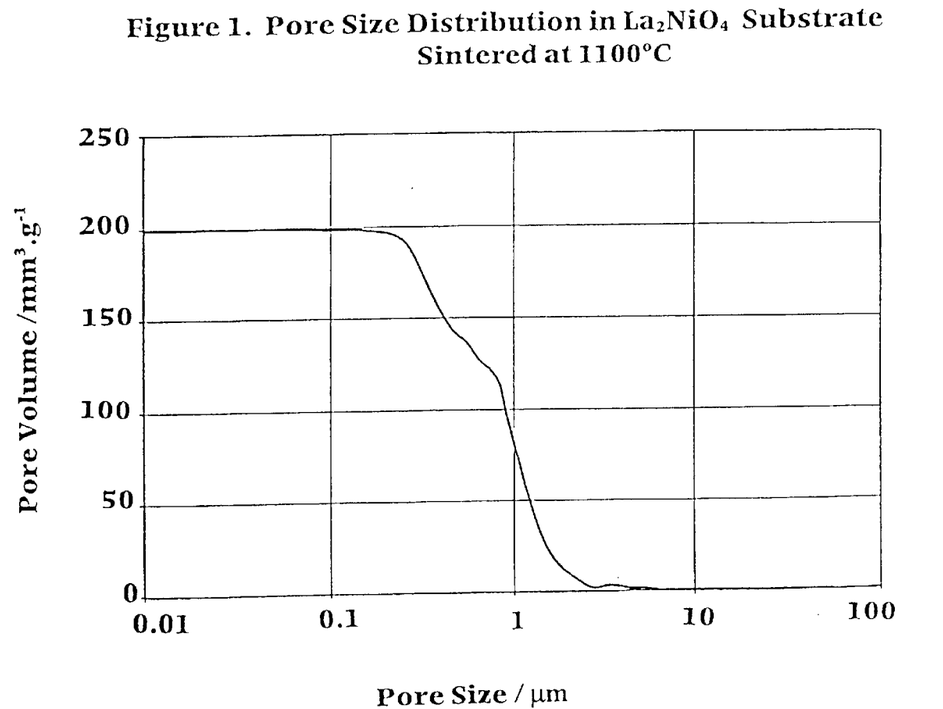
FIG. 1 shows the pore size distribution in $La_2NiO_4$ substrate sintered at 1100° C.
Figure 2:
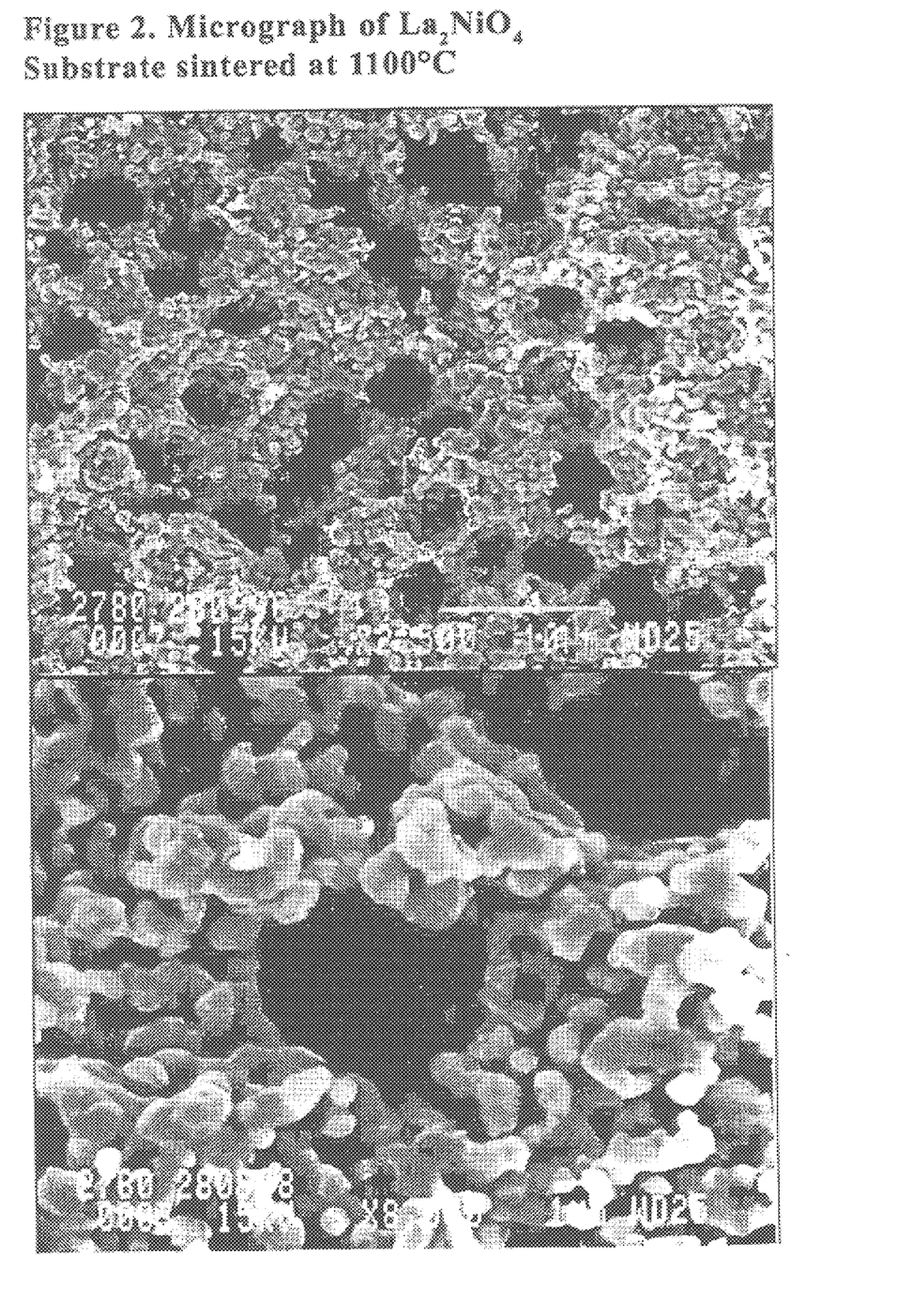
FIG. 2 shows a micrograph of $La_2NiO_4$ substrate sintered at 1100° C.

After sintering at 1100° C. for four hours, the substrate had a relative pore volume of 0.65, with a bimodal pore size distribution. The primary pores (2 $\mu$m) were formed by the removal of the polymer spheres and accounted for approximately 60% of the porosity (see FIG. 1). The secondary pores (0.1–0.2 $\mu$m) formed between the oxide grains, formed the framework of the structure (see FIG. 2) and accounted for 40% of the pore volume. It is observed that after sintering at 1100° C. for 4 hours, the linear shrinkage of the substrate is less than 1%.

EXAMPLE 2

This example shows the preparation of colloidal slip for coating porous substrate.

The colloidal dispersion or slip was made from the same oxide powder that had been used to form the porous substrate described in Example 1. The $La_2NiO_4$ powder (20 g) was mixed with ethyl acetate (20 g), Paraloid B-66 polymer (0.55 g) and Paraloid B-72 polymer (0.55 g) (Rohm and Haas Nordiska AB). The resulting slurry was ball milled in a polyethylene container with zirconia milling media, for 24 hours. The solid content of the colloidal dispersion was 12 volume %.

EXAMPLE 3

This example shows deposition of $La_2NiO_4$ coating onto a porous $LaoNiO_4$ substrate using dip coating.

Figure 3:
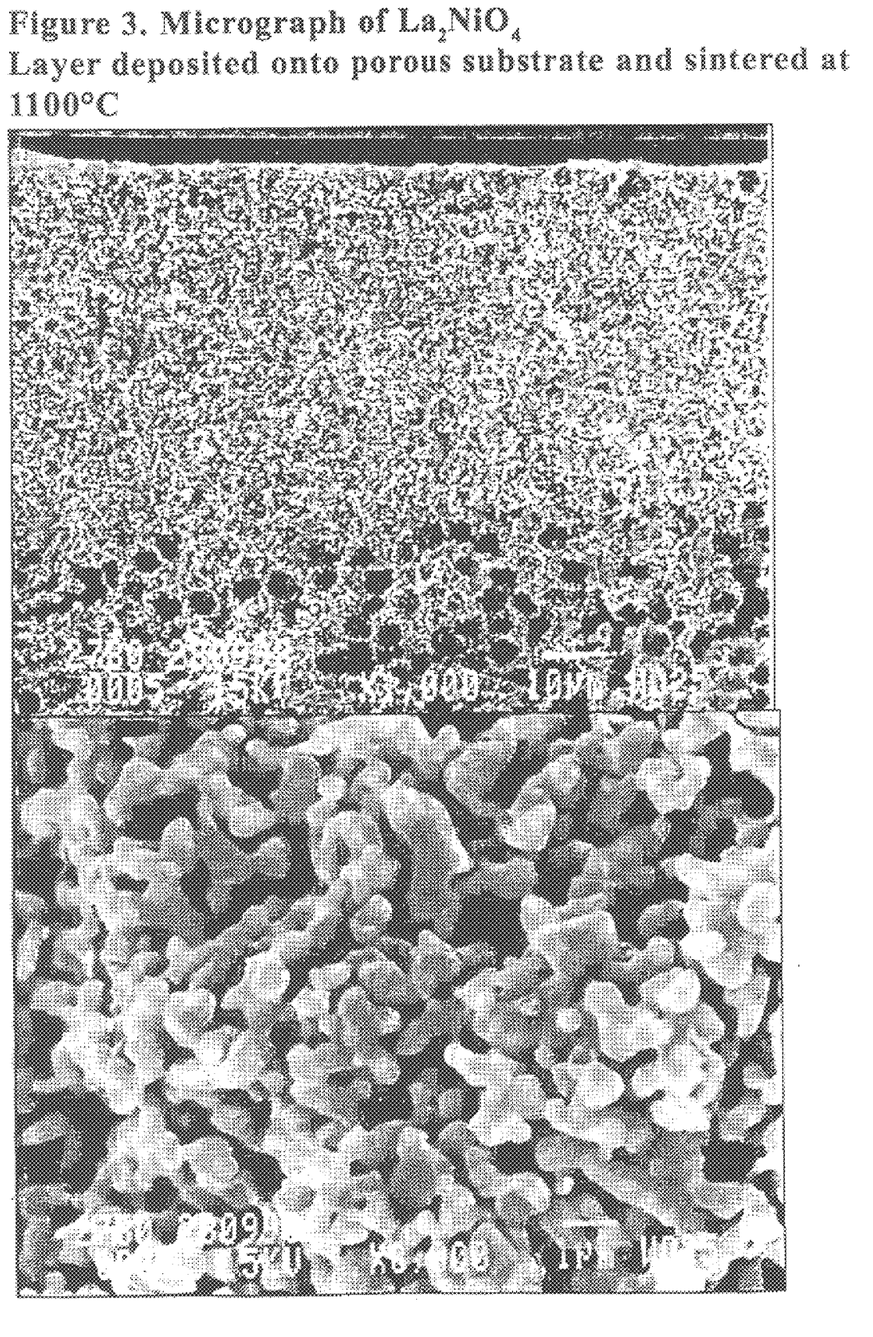
FIG. 3 shows a micrograph of $La_2NiO_4$ layer deposited onto porous substrate and sintered at 1100° C.

The coating was deposited by dipping the substrate into the slip, for periods of time of up to one minute. After the dipping process, the coated substrate was dried and slowly heated to 500° C. to remove the polymer binder from the coating and the substrate. After a thermal treatment of 1100° C., the coating was porous and it exhibited the same structure as the framework of the substrate (see FIG. 3).

EXAMPLE 4

This example shows control of pore size distribution and shrinkage in porous substrates.

Figure 4:
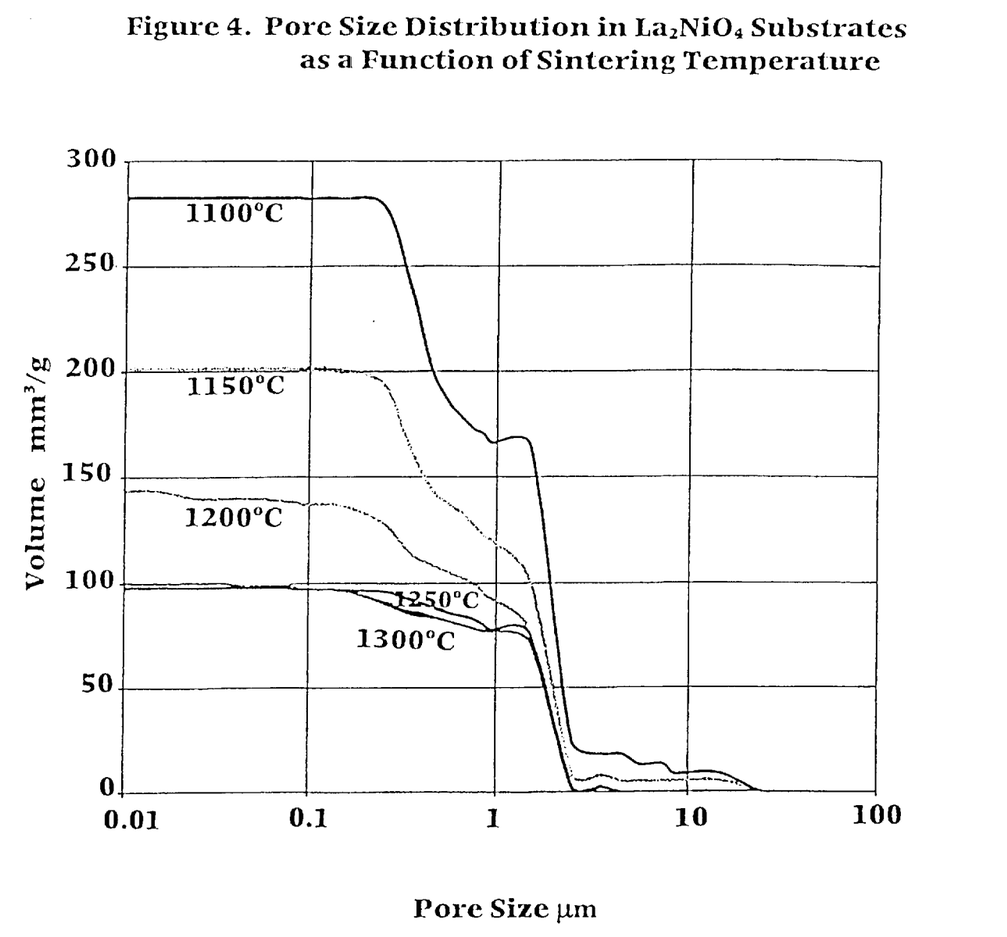
FIG. 4 shows a pore size distribution in $La_2NiO_4$ substrates as a function of sintering temperature.
Figure 5:
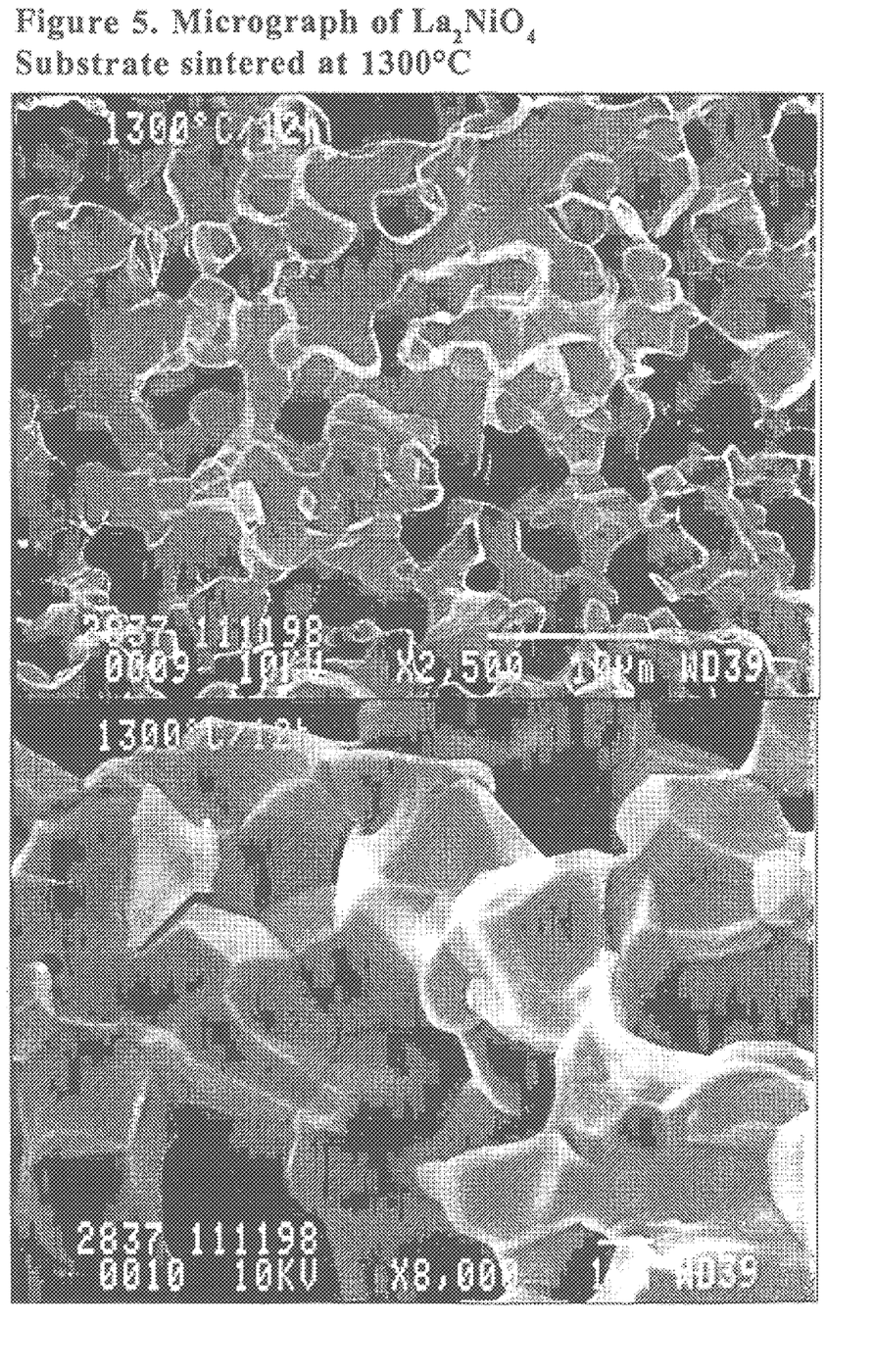
FIG. 5 shows a micrograph of $La_2NiO_4$ substrate sintered at 1300° C.

The changes in pore structure of the substrate as a function of sintering temperature are shown in FIG. 4. As the sintering temperature is increased, the pore volume is reduced and the pore size distribution is changed. It is observed that sintering at 1300° C. results in the elimination of the secondary pores, whilst the primary pores, formed by the polymer pore former, still give rise to a relative porosity of approximately 0.4 (see FIG. 5).

Figure 6:
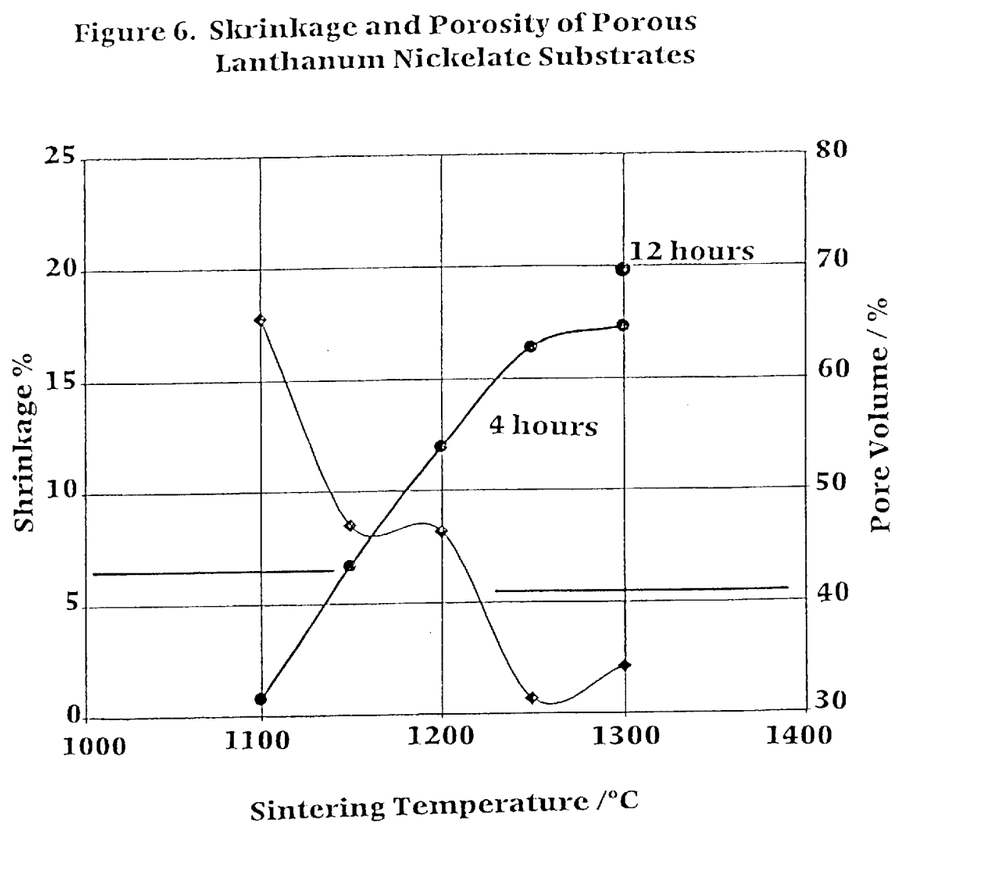
FIG. 6 shows shrinkage and porosity of porous lanthanum nickelate substrates.

The linear shrinkage of the substrate as a function of sintering temperature is shown in FIG. 6. As the sintering temperature is increased, the amount of shrinkage of the substrate also increases, to between 17 and 20% at a sintering temperature of 1300° C.

EXAMPLE 5

This example shows sintering of film on a porous substrate.

Figure 7:
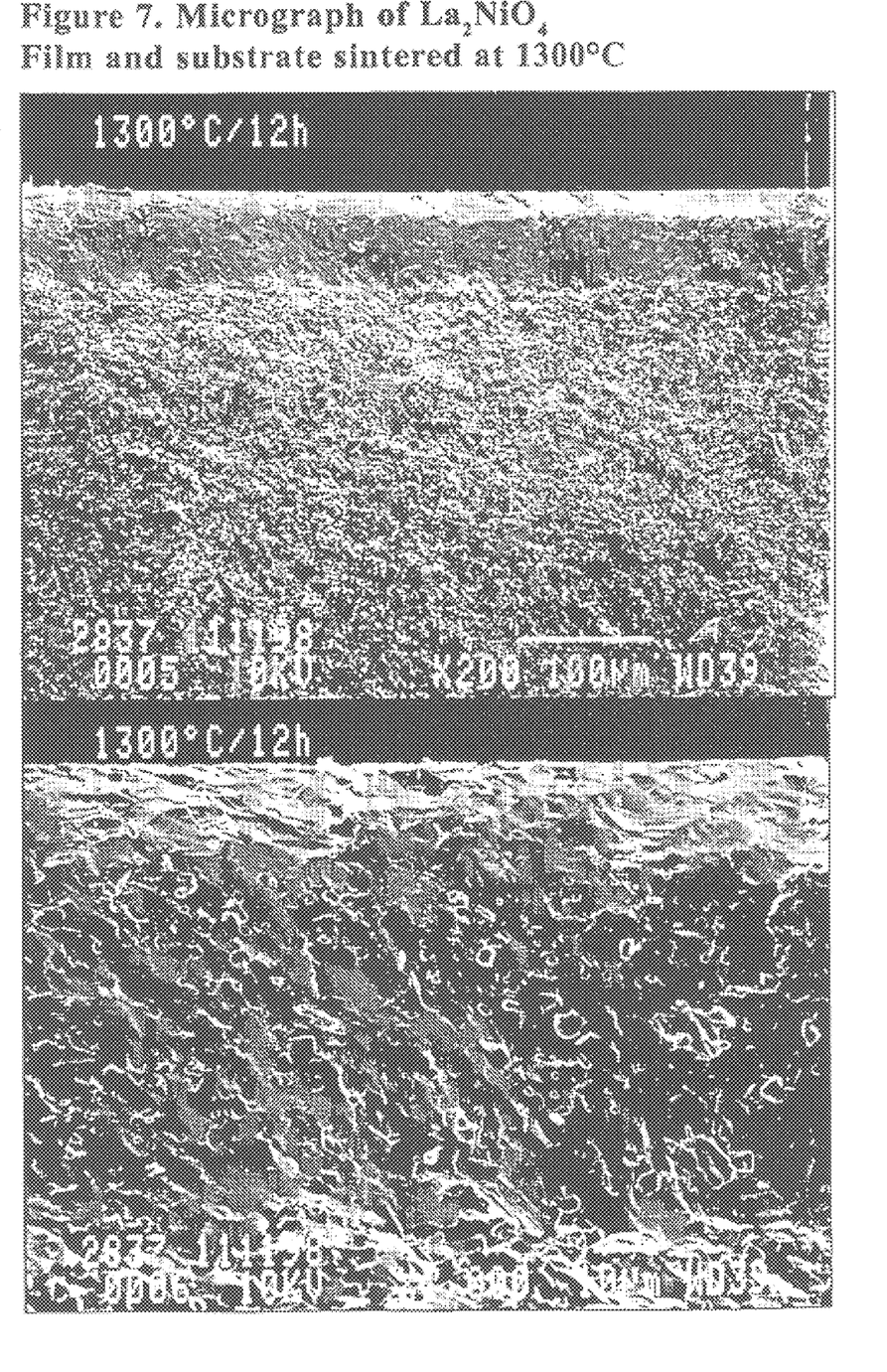
FIG. 7 shows a micrograph of $La_2NiO_4$ film and substrate sintered at 1300° C.
Figure 8:
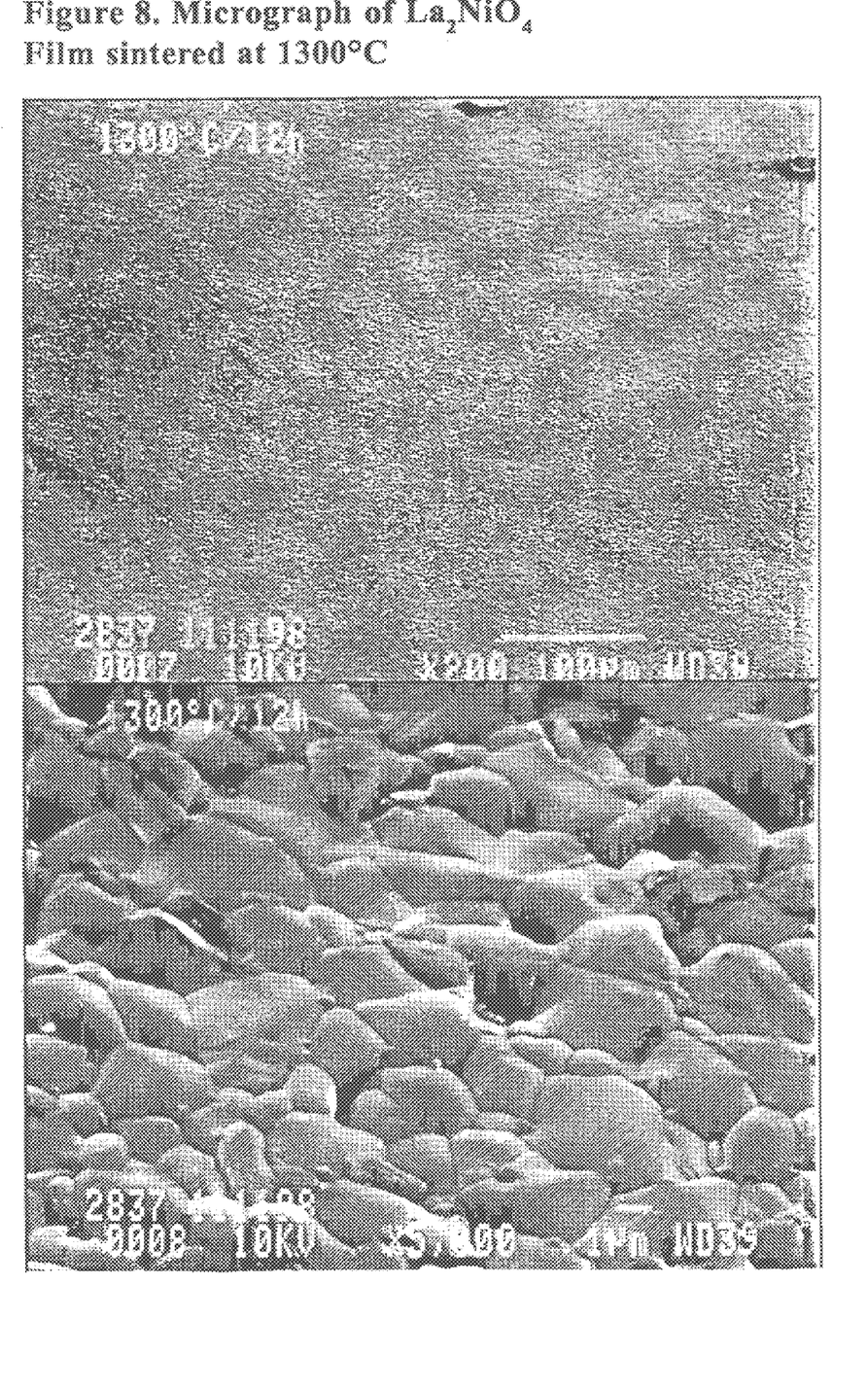
FIG. 8 shows a micrograph of $La_2NiO_4$ film sintered at 1300° C.

The microstructure of the framework of the porous substrate and the film, after thermal treatment at 1100° C. are the same. The elimination of the secondary pores in the substrate during sintering matches the sintering of the deposited film. The coated substrate was heated to 1300° C. to densify the film. This is a temperature that, in the absence of a pore former, would result in the sintering of a powder compact to a density exceeding 95% of the theoretical density. Sintering at 1300° C. leads to a high density film supported on a substrate, which retains a high degree of interconnected porosity, to allow gas transport to and from the film. Therefore, it is possible to prepare a dense, crack-free film on the porous substrate (see FIGS. 7 and 8).

What is claimed is:

1. A method for manufacturing a dense and crack-free ceramic membrane having a dense film or coating on a porous substrate which selectively transports oxygen when it is subjected to an oxygen partial pressure gradient, which comprises
    a) adding a pore former to a powder to form a mixture, heating said mixture to remove the pore former and to partially sinter the mixture to form said porous substrate,
    b) preparing a colloidal dispersion or slip from a powder having the same chemical composition and same particle size distribution as the powder used in a),
    c) dipping said substrate into said dispersion or slip where the liquid phase in said dispersion or slip is drawn into the pores of the substrate through capillary action and a layer of particles is deposited on the surface of the substrate and a further deposition of particles occurs when the substrate is withdrawn from the dispersion or slip by a dip-coating action, and
    d) sintering the substrate with the layer from c) at a temperature which results in formation of a dense film or coating supported on said substrate that retains open porosity.

2. A method according to claim 1, wherein monodisperse polymer spheres are applied as pore formers.

3. A method according to claim 1, wherein a mixed-conducting oxide powder is applied as powder.

4. A method according to claim 1, wherein the substrate and the film or coating is represented by the formula $AxA'x'A''x''ByB'y'B''y''Oz_{rd}$ where A, A' and A" are selected from the group consisting of Group 2 elements and lanthanides and $B_y$, $B'_y$, and $B''_y$, are transition metal or Group 3 elements, and wherein $0<x<2$, $0<x'<2$, $0<x''<2$, $0<y<1$, $0<y'<1$, $0<y''<1$, $1<x+x'<2$, $y+y'+y''=1$, $x+x'+x''<2$, and z±d is such that charge neutrality is maintained.

* * * * *

UNITED STATES PATENT AND TRADEMARK OFFICE
CERTIFICATE OF CORRECTION

PATENT NO. : 6,613,384 B1
DATED : September 2, 2003
INVENTOR(S) : David Waller

It is certified that error appears in the above-identified patent and that said Letters Patent is hereby corrected as shown below:

Column 3,
Line 2, change "$Oz_{zd}$" to -- $O_{z\pm d}$ --.
Line 4, change "$B_y$, $B'_y$ and $B''_y$" to -- B, B' and B" --.

Column 5,
Line 1, delete "non published".

Column 6,
Line 59, change "$Oz_{rd}$" to -- $O_{z\pm d}$ --.
Line 61, change "$B_y$, $B'_y,$ and $B''_y,$" to -- B, B' and B" --.

Signed and Sealed this

Second Day of March, 2004

JON W. DUDAS
*Acting Director of the United States Patent and Trademark Office*